United States Patent
Miyamoto et al.

(10) Patent No.: US 10,831,245 B1
(45) Date of Patent: Nov. 10, 2020

(54) ELECTRONIC DEVICE

(71) Applicant: LENOVO (SINGAPORE) PTE. LTD., Singapore (SG)

(72) Inventors: Tabito Miyamoto, Yokohama (JP);
Sara Akiyama, Yokohama (JP);
Hiroaki Kinoshita, Yokohama (JP);
Shinichi Kubota, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/737,003

(22) Filed: Jan. 8, 2020

(30) Foreign Application Priority Data

May 20, 2019 (JP) .................................. 2019-094492

(51) Int. Cl.
*G06F 1/16* (2006.01)

(52) U.S. Cl.
CPC .................................. *G06F 1/1683* (2013.01)

(58) Field of Classification Search
CPC .................................................... G06F 1/1683
See application file for complete search history.

(56) References Cited

U.S. PATENT DOCUMENTS

| | | | | | |
|---|---|---|---|---|---|
| 6,053,589 | A * | 4/2000 | Lin | ........................ | G06F 1/1616 312/271 |
| 7,926,781 | B2 * | 4/2011 | Wang | ..................... | G06F 1/1616 248/351 |
| 8,081,446 | B2 * | 12/2011 | Hsu | ......................... | G06F 1/166 361/679.23 |
| 8,891,231 | B2 * | 11/2014 | Okuley | .................... | G06F 1/166 361/679.26 |
| 9,030,820 | B2 * | 5/2015 | Guo | ....................... | G06F 1/1637 361/679.59 |
| 9,047,058 | B2 * | 6/2015 | Yu | .......................... | G06F 1/1681 |
| 9,354,669 | B2 * | 5/2016 | Chen | ...................... | G06F 1/1681 |
| 9,519,309 | B2 * | 12/2016 | Okuley | .................... | G06F 1/166 |
| 10,416,727 | B2 * | 9/2019 | Lin | ........................ | G06F 1/1681 |
| 10,503,214 | B2 * | 12/2019 | Jiang | ........................ | G06F 1/166 |
| 10,534,408 | B2 * | 1/2020 | Cheng | ...................... | G06F 1/203 |
| 10,599,179 | B2 * | 3/2020 | Okuley | .................. | G06F 1/1616 |
| 10,642,309 | B2 * | 5/2020 | Cheng | ...................... | G06F 1/166 |
| 2004/0264118 | A1 * | 12/2004 | Karidis | .................. | G06F 1/1683 361/679.55 |
| 2013/0250495 | A1 * | 9/2013 | Yu | .......................... | G06F 1/1679 361/679.01 |

FOREIGN PATENT DOCUMENTS

| | | |
|---|---|---|
| JP | 2003195976 A | 7/2003 |
| JP | 2008257529 A | 10/2008 |
| JP | 2013246518 A | 12/2013 |
| JP | 2014067396 A | 4/2014 |
| JP | 2018121149 A | 8/2018 |

* cited by examiner

*Primary Examiner* — Lisa Lea-Edmonds
(74) *Attorney, Agent, or Firm* — Shimokaji IP (57) ABSTRACT

An electronic device includes a hinge device rotatably connecting a main body chassis and a display chassis, a notch-shaped part provided in a bottom surface of the main body chassis at a position overlapping with at least a part of the hinge device and formed by removing a part of the bottom surface from its one edge part toward the other edge part, a support base made of resin and provided so as to cover a part of the notch-shaped part, and a rubber foot provided on the support base and protruding from the bottom surface of the main body chassis through the notch-shaped part.

5 Claims, 7 Drawing Sheets

ELECTRONIC DEVICE

FIELD OF THE INVENTION

The present invention relates to an electronic device including a rubber foot.

BACKGROUND OF THE INVENTION

An electronic device such as a laptop personal computer (laptop PC) usually has a plurality of rubber feet on its bottom surface (refer to Japanese Unexamined Patent Application Publication No. 2013-246518, for example). The rubber feet are to prevent the electronic device from damaging a desk or producing looseness on the desk.

SUMMARY OF THE INVENTION

Conventionally, rubber feet were directly stuck to fitting parts provided on a bottom surface of a chassis of an electronic device. However, the fitting parts for rubber feet are often in a complicated shape having irregularities and increase the cost of manufacturing the chassis. In particular, when the chassis is made of a metallic material such as magnesium in order to make it light and high-strength, a mold cost that is required for manufacturing the fitting parts for rubber feet increases.

In addition, such an electronic device is usually equipped with an antenna device for various radio communications such as a wireless LAN (Local Area Network) or a wireless WAN (Wide Area Network). The circumference of the antenna device needs to be made of a resin material etc., having radio wave transmissivity. However, when the chassis is made of metal as described above, for example, the rubber feet have radio wave transmissivity but its whole bottom surface fitted with them is made of metal, which makes it impossible to contribute to the improvement of communication quality of the antenna device.

The present invention has been made in consideration of the above-described problem of the prior art and has an object to provide an electronic device capable of reducing its manufacturing cost and in the case of a configuration equipped with an antenna device, improving the communication quality of the antenna device.

An electronic device according to the first aspect of the present invention is an electronic device including a first chassis, a second chassis, a hinge device rotatably connecting the first chassis and the second chassis, a notch-shaped part provided in a bottom surface of the first chassis at a position overlapping with at least a part of the hinge device and formed by removing a part of the bottom surface from its one edge part toward the other edge part, a support base made of resin provided so as to cover a part of the notch-shaped part, and a rubber foot provided on the support base and protruding from the bottom surface of the first chassis through the notch-shaped part.

According to such a configuration, the notch-shaped part and the support base made of resin may be provided in mounting the rubber foot and it is not necessary to form a complex recessed/projected pattern etc. in order to directly attach the rubber foot to the bottom surface of the first chassis. Thus, the electronic device can reduce the manufacturing cost of the chassis. It is to be noted that the electronic device may be equipped with an antenna device. In this case, even though the bottom surface of the first chassis is made of metal, for example, radio waves sent/received by the antenna device can be transmitted by the notch-shaped part, the support base made of resin and the rubber foot disposed therein and thus good communication quality can be achieved.

The electronic device may include an antenna device that sends and receives radio waves, and the antenna device may be disposed at a position overlapping with the notch-shaped part.

The hinge device may have a hinge shaft, a bearing rotatably supporting the hinge shaft, and a hinge chassis made of a resin material and housing the bearing therein, the hinge device may be disposed at a position where at least the hinge chassis overlaps with the notch-shaped part, and the antenna device may be housed inside the hinge chassis. Then, the antenna device has a layout structure where no member is disposed on its one surface side and radio wave transmissivity is ensured on the other surface side by the notch-shaped part, the support base, and the rubber foot. Thus, the antenna device can ensure higher communication quality.

The hinge device may have a hinge shaft, a bearing rotatably supporting the hinge shaft, and a hinge chassis made of a resin material and housing the bearing therein, the hinge chassis may be provided so as to be movable relatively to the first chassis, and the notch-shaped part may be an escape part for preventing the hinge chassis from interfering with the first chassis.

The hinge device may have a hinge shaft, a bearing rotatably supporting the hinge shaft, and a hinge chassis housing the bearing therein, the hinge chassis may be provided so as to be movable relatively to the first chassis, and the notch-shaped part may be an escape part for preventing the hinge chassis from interfering with the first chassis. Then, the rubber foot can be mounted making use of the escape part for preventing the hinge chassis from interfering with the chassis.

The notch-shaped part may be formed in a chassis member constituting the bottom surface of the first chassis, and the support base may have a fixing part to be fixed to an inner surface of the chassis member and a leg supporting part formed by extending from the fixing part toward the notch-shaped part to cover a part of the notch-shaped part and to be provided with the rubber foot. Then, the support base is manufactured in advance as a part different from the chassis member constituting the bottom surface of the first chassis and only has to be fixed to a required position in a later step. Thus, the cost can be reduced by using common parts.

The bottom surface of the first chassis may have a first chassis member made of a metallic material and a second chassis member made of a resin material and joined to an edge part of the first chassis member, and the notch-shaped part and the support base may be formed in the second chassis member. Then, the rubber foot can be supported through the second chassis member made of resin and joined to the edge part of the first chassis member by insert molding, for example. Thus, edge parts of the first chassis member made of metal can be used effectively when the second chassis member made of resin also needs to be provided in a part other than the support base, for example.

The support base may have a column member provided on a back side of a mounting surface for the rubber foot and protruding toward a top chassis member constituting a top surface of the first chassis, and the column member may abut on the top chassis member. Then, external force or impact on the rubber foot can be surely received and support strength of the rubber foot is improved.

According to the above-described aspects of the present invention, it is possible to reduce the manufacturing cost and in the case of a configuration equipped with an antenna device, improve the communication quality of the antenna device.

DETAILED DESCRIPTION OF THE INVENTION

Preferable embodiments of the electronic device according to the present invention are described in detail below with reference to the attached drawings.

Figure 1:
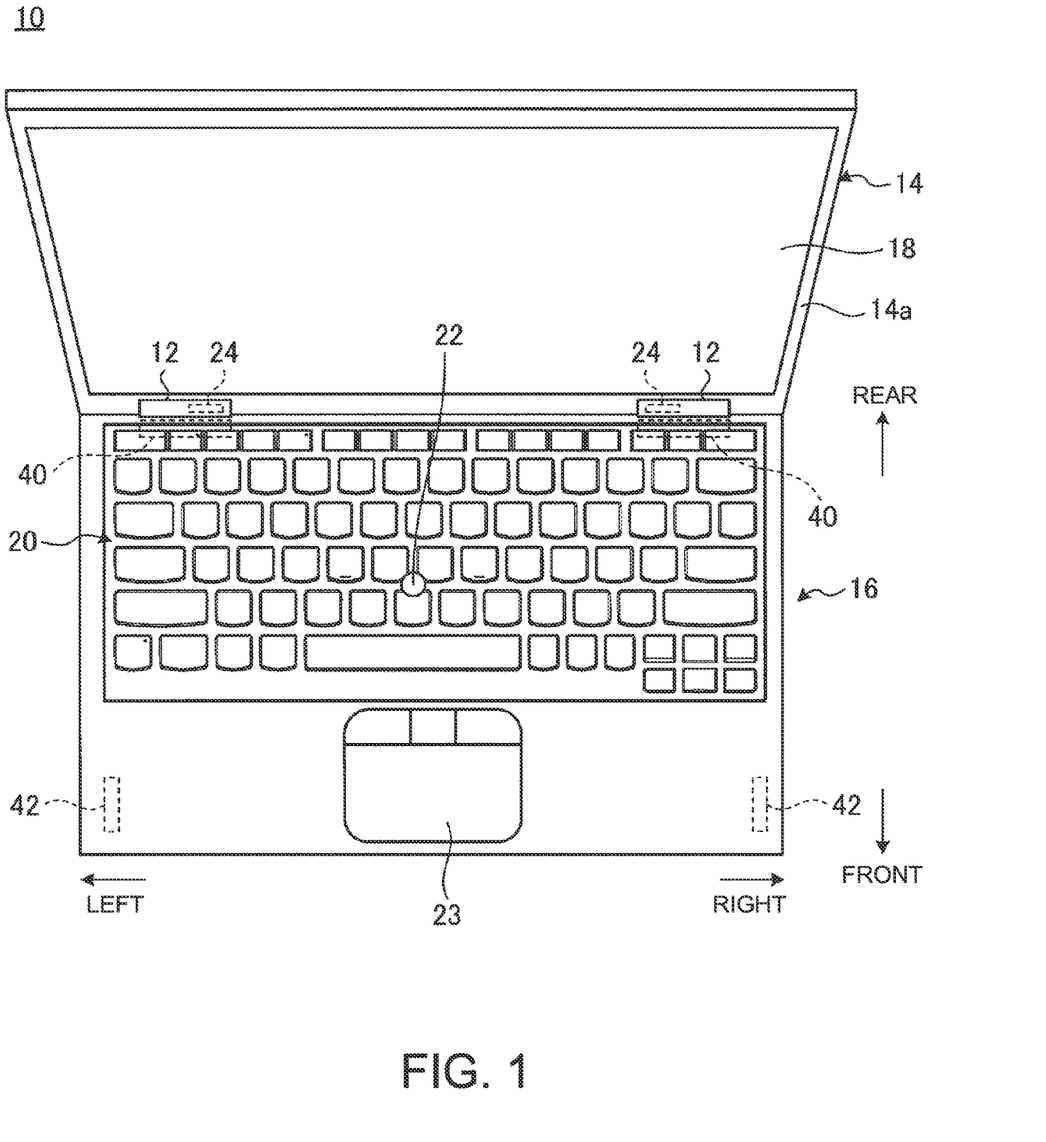
FIG. 1 is a plan view of an electronic device according to the first embodiment.

FIG. 1 is a plan view of an electronic device 10 according to the first embodiment. FIG. 1 illustrates a state (usage form) in which a display chassis 14 is opened from a main body chassis 16 by a hinge device 12.

The electronic device 10 of the present embodiment is a convertible PC that can be used as a laptop PC and a tablet PC. The display chassis 14 can be rotated from a 0-degree position (refer to FIG. 4A) where a display 18 is closed with respect to the main body chassis 16 to a 360-degree position (refer to FIG. 4B) where it is flipped. The electronic device 10 will be in a laptop mode in which it can be preferably used as a laptop PC in a state in which the display chassis 14 is rotated to an angular position of about 90 degrees to 180 degrees with respect to the main body chassis 16 (refer to FIG. 1). The electronic device 10 will be in a tablet mode in which it can be preferably used as a tablet PC in a state in which the display chassis 14 is rotated to the 360-degree position with respect to the main body chassis 16 (refer to FIG. 4B). The electronic device 10 may be a general laptop PC capable of rotating the display chassis 14 in an angular range of 0 degrees to 180 degrees with respect to the main body chassis 16. The electronic device 10 can be preferably applied to a configuration of rotatably connecting two chassis, such as a mobile phone, a smartphone, or an electronic notebook, in addition to the convertible PC or laptop PC.

In the following description, based on the laptop mode illustrated in FIG. 1, the direction toward the user operating a keyboard device 20 while viewing the display 18 is front, the direction away from the user is rear, the thickness direction of the main body chassis 16 is top and bottom, and the width direction is left and right.

In the electronic device 10, a bottom end part of the display chassis 14 and a rear end part of the main body chassis 16 are rotatably connected by a pair of right and left hinge devices 12 and 12.

The display chassis 14 is a thin rectangular box body. The display 18 is provided on a front surface of the display chassis 14. The display 18 is a touch panel type liquid crystal display, for example.

The main body chassis 16 is a thin rectangular box body. The keyboard device 20, a pointing stick 22, and a touch pad 23 are provided on a top surface of the main body chassis 16. A motherboard 39 (refer to FIG. 3), an arithmetic device, and various electronic components such as a memory are stored in the main body chassis 16.

Figure 2:
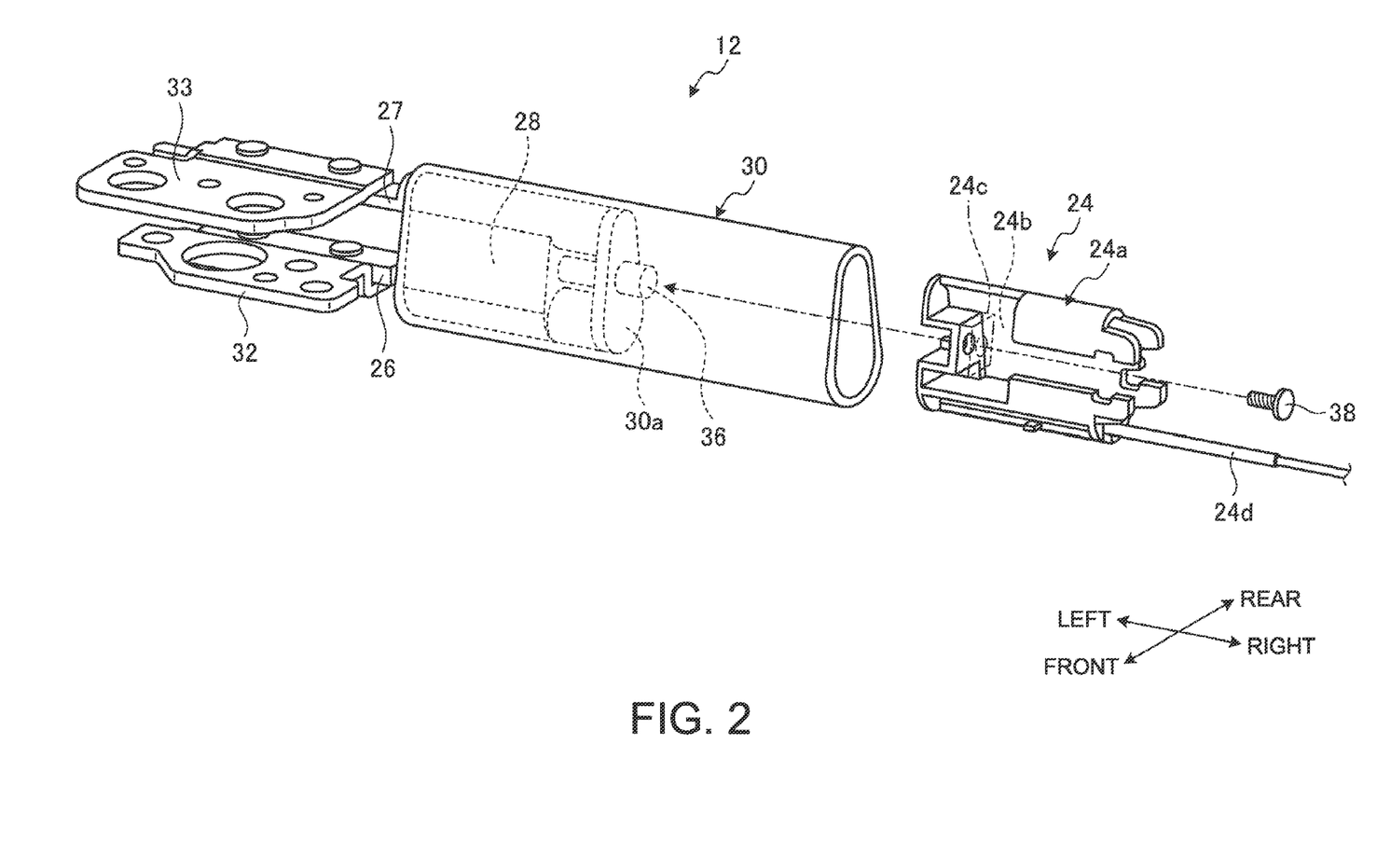
FIG. 2 is an exploded perspective view illustrating one example of a configuration of attaching an antenna device to a hinge device.

FIG. 2 is an exploded perspective view illustrating one example of a structure of attaching an antenna device 24 to the hinge device 12.

As illustrated in FIG. 2, the hinge device 12 includes a first hinge shaft 26, a second hinge shaft 27, a bearing 28, and a hinge chassis 30. The first hinge shaft 26, the second hinge shaft 27, and the bearing 28 are made of a metallic material such as stainless steel, steel, or aluminum. The hinge chassis 30 is made of material that has radio wave transmissivity, for example, a resin material such as polyphenylene sulfide (PPS). The right and left hinge devices 12 and 12 have the same structure except for having symmetrical structures. The antenna device 24 is housed in the hinge chassis 30 of each of the right and left hinge devices 12 and 12 (refer to FIG. 1). The antenna device 24 may also be provided only in the right or left hinge device 12.

The first hinge shaft 26 is a pin-like member extending in the right-left direction. One end part of the first hinge shaft 26 is rotatably supported on the bearing 28. The other end part of the first hinge shaft 26 protrudes outside the hinge chassis 30 and is fixed to the main body chassis 16 through a first chassis mounting member 32. Thus, the main body chassis 16 is configured integrally with the first hinge shaft 26 and can rotate relatively to the bearing 28.

The second hinge shaft 27 is a pin-like member extending in the right-left direction. One end part of the second hinge shaft 27 is rotatably supported on the bearing 28. The other end part of the second hinge shaft 27 protrudes outside the hinge chassis 30 and is fixed to the display chassis 14 through a second chassis mounting member 33. Thus, the display chassis 14 is configured integrally with the second hinge shaft 27 and can rotate relatively to the bearing 28.

The bearing 28 is a block-like member that has substantially the same cross-sectional shape as that of the hinge chassis 30. The bearing 28 rotatably supports each of the hinge shafts 26 and 27. A gear mechanism that synchronizes the rotation of the first hinge shaft 26 and that of the second hinge shaft 27 is stored in the bearing 28. The hinge device 12 is not configured so that the hinge shafts 26 and 27 synchronously rotate, but may be configured so as to switch axes of rotation in accordance with the rotating range of the display chassis 14. A torque generating mechanism that generates a predetermined rotational torque in the hinge shafts 26 and 27 is connected to the bearing 28.

The hinge chassis 30 is a cylindrical cap that houses each of the hinge shafts 26 and 27, the bearing 28, and the antenna device 24. The hinge chassis 30 has a substantially elliptical cross-sectional shape. The hinge chassis 30 is arranged in recessed hinge arranging parts 14a and 16a provided in the rear end parts of the display chassis 14 and the main body chassis 16 (refer to FIG. 3) and rotates within the hinge arranging parts 14a and 16a.

The hinge chassis 30 has an attaching plate 30a by which cylindrical internal space is separated approximately at the center part in the right-left direction. The hinge chassis 30 is fastened to the bearing 28 with a screw part 36 inserted through a through-hole of the attaching plate 30a. A female screw is formed in the head part of the screw part 36. The antenna device 24 is fastened to the female screw of the head part using a screw 38. Thus, the hinge chassis 30 and the antenna device 24 are configured integrally with the bearing 28 and can rotate relatively to each of the hinge shafts 26 and 27.

The antenna device 24 is an antenna that sends and receives radio waves of a wireless LAN, for example. The antenna device 24 may correspond to a wireless WAN etc. in addition to a wireless LAN. The antenna device 24 is configured so that an antenna element 24b is provided in a holder part 24a made of resin. The antenna element 24b is a conductive pattern for sending/receiving radio waves. The antenna element 24b is provided on a surface of the holder part 24a by screen printing or adhesion, for example. In the present embodiment, the antenna element 24b is provided on an outer surface facing rearward, of the holder part 24a. The antenna device 24 is also provided with a ground element. In the holder part 24a, a metallic plate 24c for electrically connecting the ground element to the bearing 28 through the screw part 36 is attached at a fastening part of the screw 38. That is, the ground element is electrically connected to the main body chassis 16 and the display chassis 14 through the metallic plate 24c, the screw 38, the screw part 36, the bearing 28, the hinge shafts 26 and 27, and the chassis mounting members 32 and 33. Thus, the antenna device is frame-grounded. The antenna element 24b is electrically connected to the motherboard 39 and a communication circuit etc. in the main body chassis 16 through an antenna cable 24d.

Figure 3:
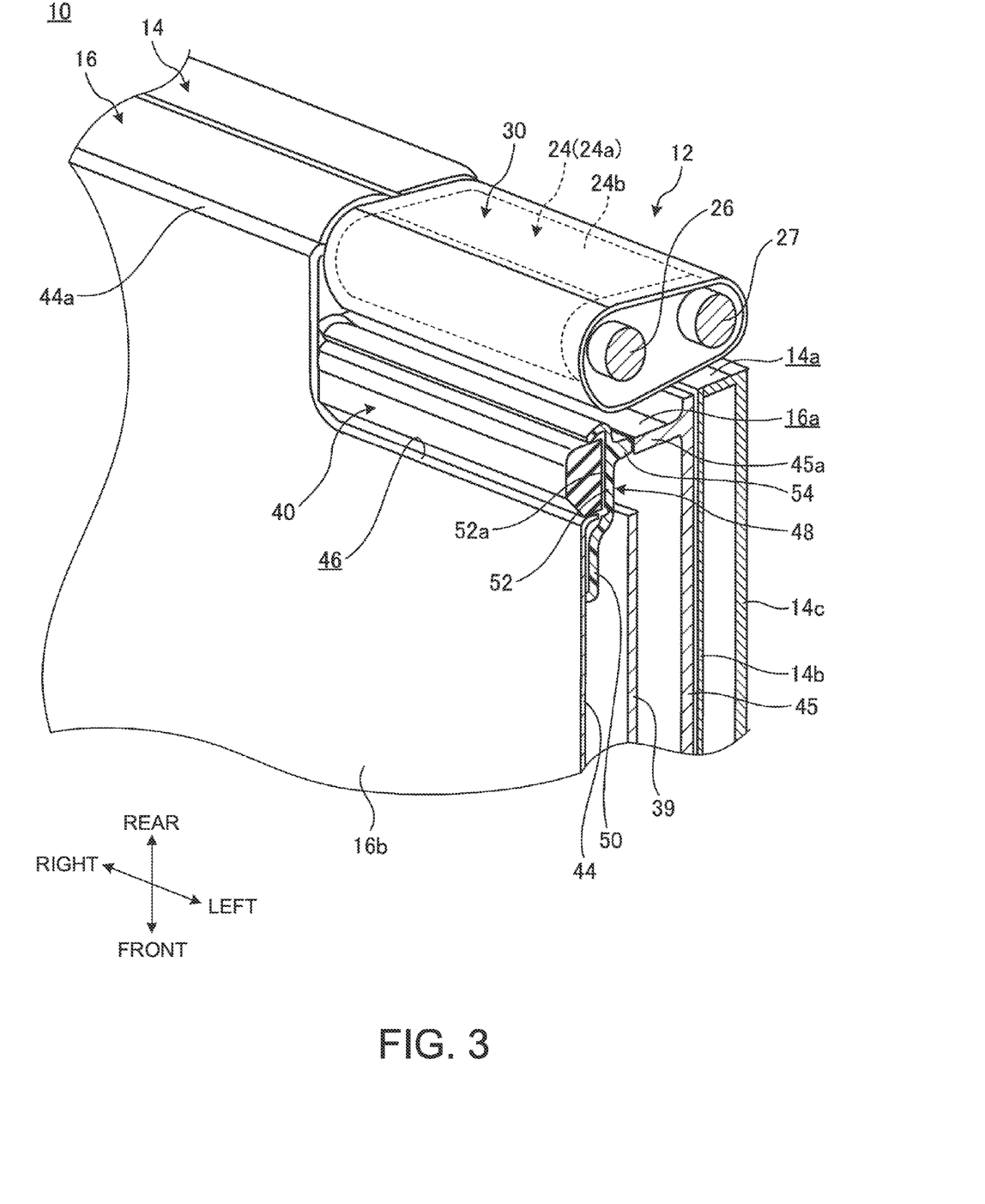
FIG. 3 is an enlarged cross sectional view of a main part in which a position overlapping with the hinge device of the electronic device in a 0-degree position is cut by a plane along the top-bottom direction and the front-rear direction.
Figure 4A:
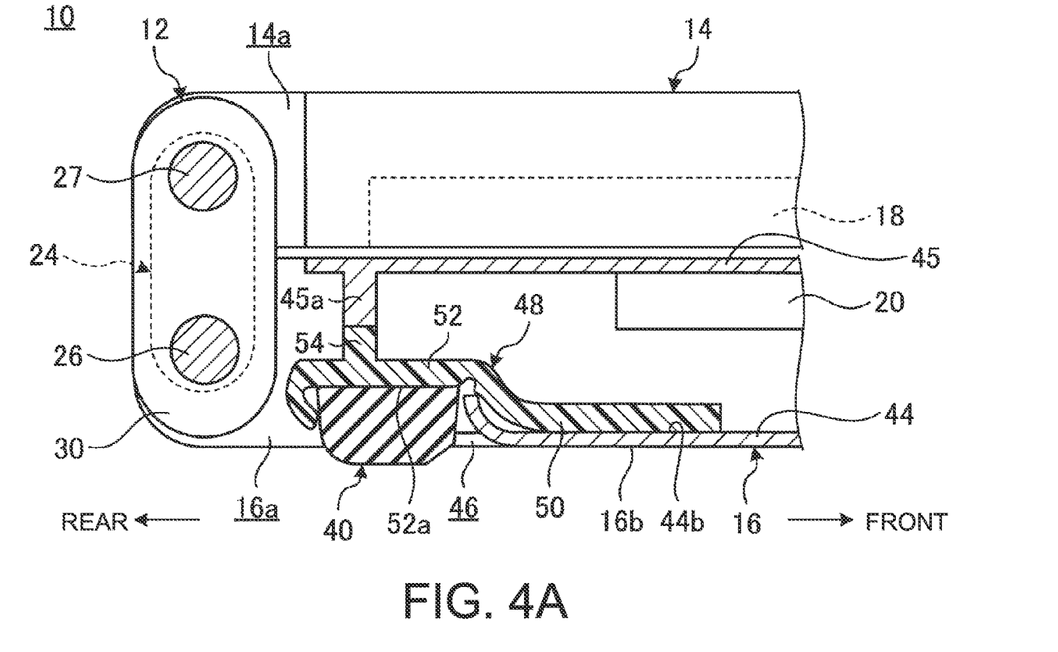
FIG. 4A is a side cross sectional view of the electronic device illustrated in FIG. 3.
Figure 4B:
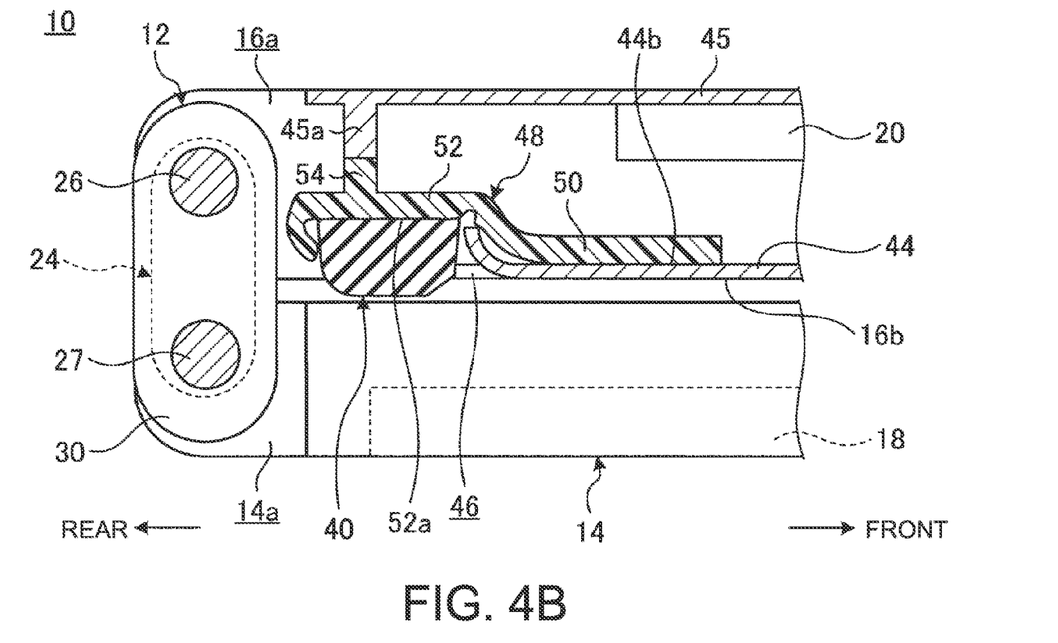
FIG. 4B is a side cross sectional view in a state in which the electronic device illustrated in FIG. 4A is placed in a 360-degree position.

FIG. 3 is an enlarged cross sectional view of a main part in which a position overlapping with the hinge device 12 of the electronic device 10 in a 0-degree position is cut by a plane along the top-bottom direction and the front-rear direction. FIG. 4A is a side cross sectional view of the electronic device 10 illustrated in FIG. 3. FIG. 4B is a side cross sectional view in a state in which the electronic device 10 illustrated in FIG. 4A is placed in a 360-degree position.

As illustrated in FIG. 3, FIG. 4A, and FIG. 4B, a rubber foot 40 is provided on the bottom surface 16b of the main body chassis 16. A pair of right and left rubber feet 40 is provided so as to be close to the right and left hinge devices 12 and 12, respectively (refer to FIG. 1). The rubber foot 40 is a rubber member that extends in the right-left direction and having cross sectional shape formed into a substantially dome shape, for example. A pair of right and left rubber feet 42 and 42 is also provided on a front edge part of the bottom surface 16b. The rubber foot 42 is a rubber member that extends in the front-rear direction and having cross sectional shape formed into a substantially dome shape, for example. The rubber feet 40 and 42 are cushion materials that abut on a top board of a desk when the electronic device 10 is placed on the desk etc.

The main body chassis 16 is formed into a box by coupling a bottom chassis member 44 constituting the bottom surface 16b and a top chassis member 45 constituting a top surface. The bottom chassis member 44 is a plate-like member made of a metallic material such as magnesium or a resin material, for example. The bottom chassis member 44 in the present embodiment is made of magnesium. The top chassis member 45 is a plate-like member made of a metallic material such as magnesium or a resin material, for example. The display chassis 14 is formed into a box by coupling a front chassis member 14b serving as a bezel of the display 18 and a back chassis member 14c.

The bottom chassis member 44 is provided with a notch-shaped part 46 and a support base 48.

The notch-shaped part 46 is formed by notching a part of a rear edge part 44a of the bottom chassis member 44 toward the front to remove a part of the bottom chassis member 44. A pair of right and left notch-shaped parts 46 is provided and they constitute a part of the right and left hinge arranging parts 16a, respectively. Thus, the notch-shaped part 46 is disposed at a position overlapping with the antenna device 24 housed in the hinge chassis 30 in the top-bottom direction. That is, the notch-shaped part 46 serves as an escape part for preventing the hinge chassis 30 that rotates relatively to the main body chassis 16 from interfering with the main body chassis 16. The notch-shaped part 46 has a structure in which a part of the rear edge part 44a is notched by about twice the thickness of the hinge chassis 30, and has a substantially rectangular shape in plan view.

Figure 5:
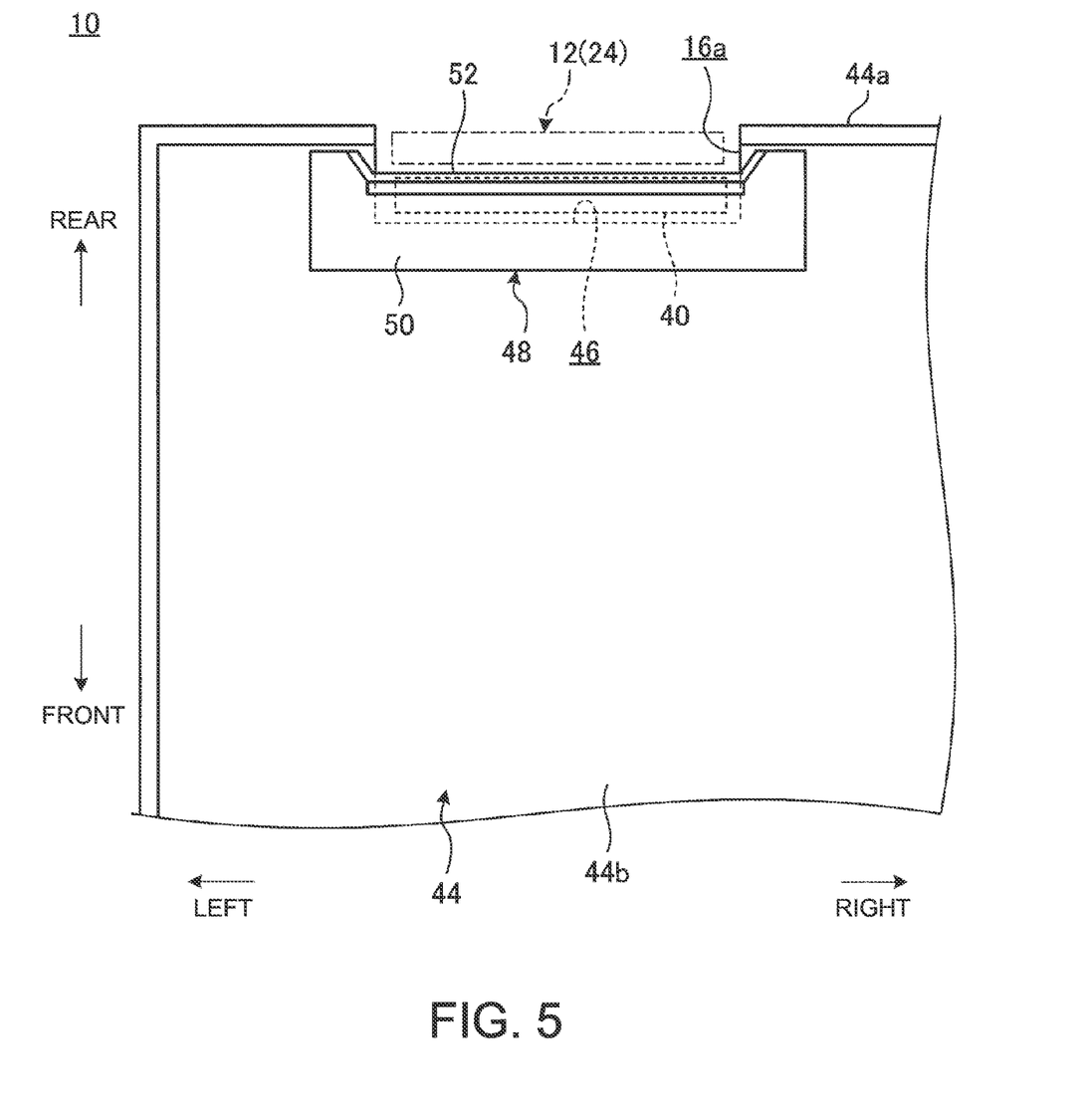
FIG. 5 is a plan view enlarging a part of a bottom chassis member.

FIG. 5 is a plan view enlarging a part of the bottom chassis member 44 and is a diagram of the bottom chassis member 44 as viewed from an inner surface 44b side. The support base 48 is made of a resin material that has radio wave transmissivity. As illustrated in FIG. 3 to FIG. 5, the support base 48 has a fixing part 50, a leg supporting part 52, and a column member 54.

The fixing part 50 is a flange part that is provided so as to surround three sides of the notch-shaped part 46, i.e., right and left edge parts, and a front edge part, and is fixed to the inner surface 44b of the bottom chassis member 44. The fixing part 50 is fixed to the inner surface 44b by adhesive or a screw, for example.

The leg supporting part 52 is a veranda-like plate part that extends to project from the fixing part 50 toward the notch-shaped part 46 to cover a part of the notch-shaped part 46. The leg supporting part 52 bends from the fixing part 50 upward (toward the top chassis member 45) and then extends parallel to the inner surface 44b. Thus, the leg supporting part 52 covers a part of a region removed by the notch-shaped part 46, of the bottom chassis member 44 (a substantially front half region). The rubber foot 40 is provided on a bottom surface (a mounting surface 52a) of the leg supporting part 52. The rubber foot 40 is fixed to the mounting surface 52a by adhesive or double-sided tape, for example. The rubber foot 40 is provided so as to fill the substantially front half region of the notch-shaped part 46 and protrudes from the bottom surface 16b downward through the notch-shaped part 46. The hinge chassis 30 is disposed in a substantially rear half region of the notch-shaped part 46. The support base 48 may be integrally molded with the rubber foot 40 by two-color molding, for example. It is to be noted that because the rubber foot 40 is formed in substantially the same width dimension as the hinge chassis 30, simple and good quality of appearance can be achieved.

The column member 54 is a wall-like rib that protrudes from a back side of the mounting surface 52a upward (toward the top chassis member 45). The top of the column member 54 abuts on a receiving part 45a that protrudes from an inner surface of the top chassis member 45 downward. The receiving part 45a may be omitted. In this case, the column member 54 may abut directly on the inner surface of the top chassis member 45. The column member 54 is a reinforced member to support the leg supporting part 52 whose rear edge part is floating in the region removed by the notch-shaped part 46 and surely receive external force or impact on the rubber foot 40. The column member 54 may be omitted.

As described above, the electronic device 10 of the present embodiment includes the hinge device 12, the notch-shaped part 46 that is provided in the bottom surface 16*b* (bottom chassis member 44) of the main body chassis 16 and has a shape obtained by recessing one edge part thereof, the support base 48 that is made of resin and provided so as to project toward the notch-shaped part 46, and the rubber foot 40. The rubber foot 40 is provided on the support base 48 and protrudes from the bottom surface 16*b* of the main body chassis 16 through the notch-shaped part 46.

Therefore, in the electronic device 10, the notch-shaped part 46 and the support base 48 made of resin may be provided in the bottom surface 16*b* (bottom chassis member 44) of the main body chassis 16 in mounting the rubber foot and it is not necessary to form a complex recessed/projected pattern etc. in order to directly attach the rubber foot 40 to the bottom surface 16*b*. Thus, in the electronic device 10, it is possible to simplify a structure of a mold for molding the bottom surface 16*b* and reduce the manufacturing cost. In addition, because the rubber feet 40 are disposed as close as possible to the rear edge part 44*a* of the bottom surface 16*b*, arrangement balance relative to the center of gravity when opening the display chassis 14 is also good.

Furthermore, in the electronic device 10, the antenna device 24 is housed in the hinge chassis 30. Then, the notch-shaped part 46 is provided in the rear edge part 44*a* of the bottom surface 16*b* (bottom chassis member 44) of the main body chassis 16 and this notch-shaped part 46 is used for a part of the hinge arranging part 14*a* that arranges the hinge chassis 30. That is, at the bottom front side of the antenna device 24, the notch-shaped part 46, the support base 48 made of resin and projecting toward the notch-shaped part 46 in a veranda-like manner, and the rubber foot 40 made of rubber and provided on the support base 48 are disposed. Thus, a member that shuts out radio waves, like a metallic material, is not disposed at the bottom front side of the antenna device 24, and a member itself is not disposed at the rear side of the antenna device 24. As a result, the antenna device 24 can send and receive radio waves with high communication quality.

It is to be noted that because the notch-shaped part 46 is filled with the hinge chassis 30, the support base 48, and the rubber foot 40, the notch-shaped part 46 is inconspicuous in the bottom surface 16*b* even though opening area of the notch-shaped part 46 is expanded. Thus, it is also possible to ensure a larger area of a radio wave transmission window for the antenna device 24 by expanding the notch-shaped part 46 as large as possible.

The antenna device 24 may be disposed at other positions in the main body chassis 16, for example, instead of being mounted inside the hinge chassis 30. Still, in this case, if the antenna device 24 is provided at a position overlapping with the support base 48 and the rubber foot 40, high communication quality can be achieved as above.

The support base 48 has the fixing part 50 that is fixed to the inner surface 44*b* of the bottom chassis member 44 and the leg supporting part 52 that extends to project from the fixing part 50 toward the notch-shaped part 46 and is provided with the rubber foot 40. Thus, the support base 48 can be fixed afterwards to the bottom chassis member 44 made of a metallic material, for example. Thus, because unitized support base 48 and rubber foot 40 can be used for each of the right and left notch-shaped parts 46 and 46, the cost can be reduced by using common parts.

Figure 6:
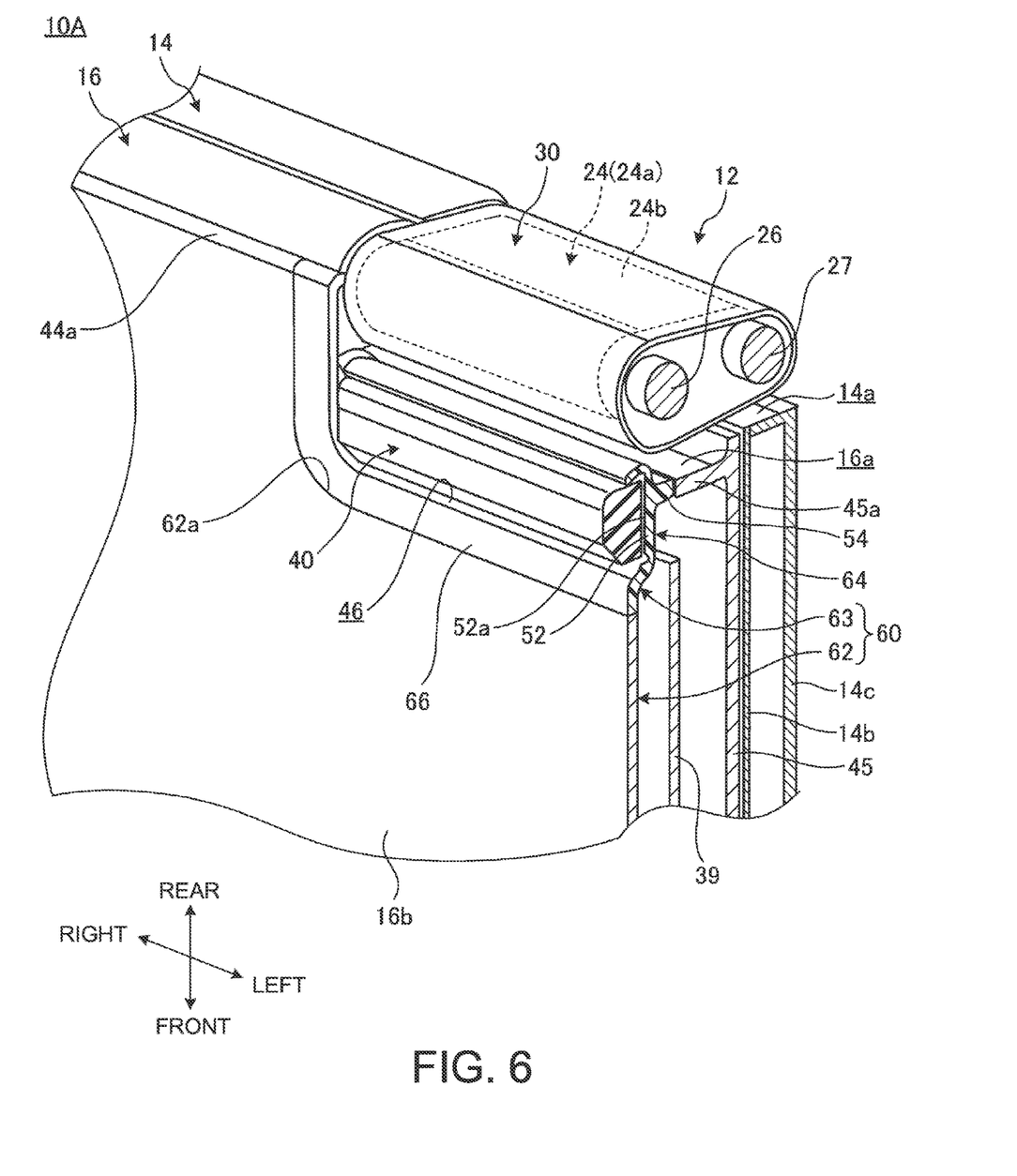
FIG. 6 is an enlarged cross sectional view of a main part in which a position overlapping with the hinge device of the electronic device according to the second embodiment in a 0-degree position is cut by a plane along the top-bottom direction and the front-rear direction.
Figure 7:
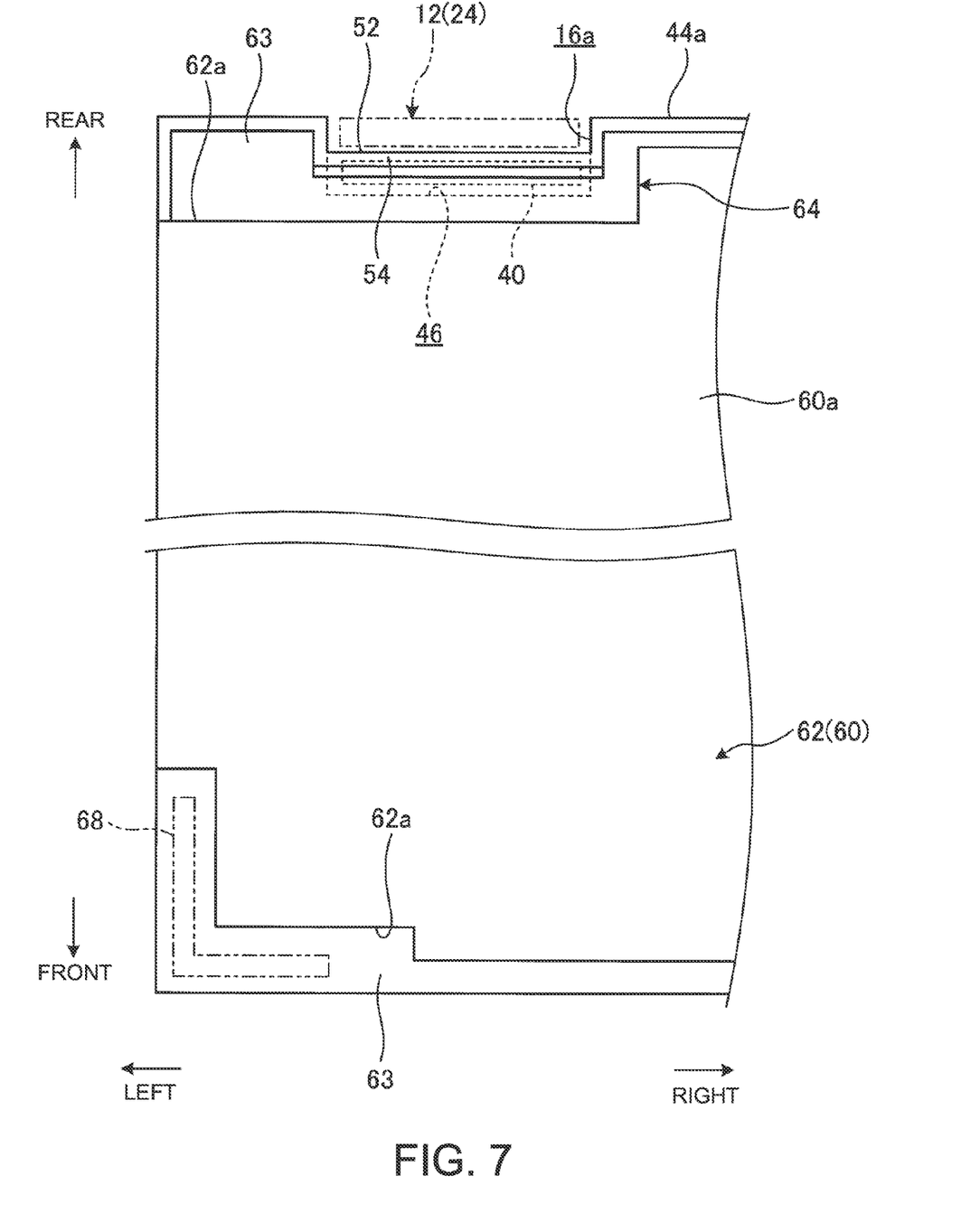
FIG. 7 is a plan view enlarging a part of a bottom chassis member of the electronic device illustrated in FIG. 6.

FIG. 6 is an enlarged cross sectional view of a main part in which a position overlapping with the hinge device 12 of the electronic device 10A according to the second embodiment in a 0-degree position is cut by a plane along the top-bottom direction and the front-rear direction. FIG. 7 is a plan view enlarging a part of a bottom chassis member 60 of the electronic device 10A illustrated in FIG. 6 and is a diagram of the bottom chassis member 60 as viewed from an inner surface 60*a* side. In the electronic device 10A according to the second embodiment, elements that provide functions and effects identical or similar to the electronic device 10 according to the above first embodiment are denoted by identical reference symbols, and the detailed description thereof will be omitted.

As illustrated in FIG. 6 and FIG. 7, the electronic device 10A includes the bottom chassis member 60 that has a configuration different from that of the above-described bottom chassis member 44 of the electronic device 10. The bottom chassis member 60 has a configuration in which a second chassis member 63 is joined to a first chassis member 62.

The first chassis member 62 is made of a metallic material such as magnesium, for example. The second chassis member 63 is made of a resin material that has radio wave transmissivity and joined to an end surface of an edge part 62*a* of the first chassis member 62 by insert molding. As illustrated in FIG. 7, the second chassis member 63 is joined to not only the edge part 62*a* at the rear side of the first chassis member 62 but also an edge part 62*a* at a front corner part.

The second chassis member 63 is provided with the notch-shaped part 46 and a support base 64. The support base 64 has a fixing part 66 that has a configuration different from that of the above-described fixing part 50 of the support base 48 of the electronic device 10. The fixing part 66 is joined to an end surface of the edge part 62*a* of the first chassis member 62. Thus, the fixing part 66 constitutes a part of the bottom surface 16*b* of the main body chassis 16 together with the first chassis member 62.

As described above, in the electronic device 10A of the present embodiment, the second chassis member 63 made of resin is joined to the first chassis member 62 made of metal by insert molding. Then, the second chassis member 63 is provided with the support base 64 and the rubber foot 40 is supported by the support base 64.

Thus, also in the electronic device 10A, it is possible to simplify the structure of the bottom surface 16*b* and ensure communication quality of the antenna device 24, as is the case with the above-described electronic device 10. In the meanwhile, manufacturing cost of the support base 64 of the electronic device 10A is higher than that of the above-described support base 48 of the electronic device 10 because the support base 64 is formed by molding using insert molding. However, because the support base 64 is joined to the end surface of the edge part of the first chassis member 62, it is not disposed while being overlapped with the inner surface 44*b* of the bottom chassis member 44 unlike the fixing part 50 of the support base 48 and contributes to making the main body chassis 16 thin.

In the electronic device 10A, the second chassis member 63 is joined to the first chassis member 62 by insert molding. Thus, the second chassis member 63 made of resin can be appropriately joined to a peripheral part of the first chassis member 62 simultaneously with a process of forming the support base 64. As a result, when installing an antenna device 68 different from the antenna device 24 in the front corner part of the main body chassis 16, for example, it is possible to provide this antenna device 68 in the second chassis member 63 made of resin and ensure its communication quality.

In addition, it is a matter of course that the present invention is not limited to the embodiments described above and can be freely altered without deviating from the scope of the present invention.

The hinge device that has a two-shaft structure has been illustrated by an example as the hinge device 12. However, the hinge device 12 may have a single-shaft structure using only one of the first hinge shaft 26 and the second hinge shaft 27.

The invention claimed is:

1. An electronic device comprising:
a first chassis;
a second chassis;
a hinge device rotatably connecting the first chassis and the second chassis;
a notch-shaped part in a bottom surface of the first chassis and at a position overlapping with at least a part of the hinge device and formed by removing a part of the bottom surface;
a support base made of resin and covers a part of the notch-shaped part;
a rubber foot on the support base and which extends from the bottom surface of the first chassis and through the notch-shaped part;
an antenna device that sends and receives radio waves, wherein the antenna device is disposed at a position overlapping with the notch-shaped part;
wherein the hinge device has:
a hinge shaft;
a bearing rotatably supporting the hinge shaft; and
a hinge chassis made of a resin material and which houses the bearing therein,
wherein the hinge device is disposed at a position where at least the hinge chassis overlaps with the notch-shaped part, and
wherein the antenna device is housed inside the hinge chassis.

2. The electronic device according to claim 1, wherein:
the hinge chassis is movable relative to the first chassis, and
the notch-shaped part prevents the hinge chassis from interfering with the first chassis.

3. The electronic device according to claim 1,
wherein the bottom surface of the first chassis has a first chassis member made of a metallic material and a second chassis member made of a resin material and joined to an edge part of the first chassis member, and
wherein the notch-shaped part and the support base are in the second chassis member.

4. An electronic device comprising:
a first chassis;
a second chassis;
a hinge device rotatably connecting the first chassis and the second chassis;
a notch-shaped part in a bottom surface of the first chassis and at a position overlapping with at least a part of the hinge device and formed by removing a part of the bottom surface;
a support base made of resin and covers a part of the notch-shaped part;
a rubber foot on the support base and which extends from the bottom surface of the first chassis and through the notch-shaped part;
wherein the notch-shaped part is in a chassis member constituting the bottom surface of the first chassis, and
wherein the support base has a fixing part to be fixed to an inner surface of the chassis member and a leg supporting part that extends from the fixing part toward the notch-shaped part to cover a part of the notch-shaped part and to receive the rubber foot.

5. An electronic device comprising:
a first chassis;
a second chassis;
a hinge device rotatably connecting the first chassis and the second chassis;
a notch-shaped part in a bottom surface of the first chassis and at a position overlapping with at least a part of the hinge device and formed by removing a part of the bottom surface;
a support base made of resin and covers a part of the notch-shaped part;
a rubber foot on the support base and which extends from the bottom surface of the first chassis and through the notch-shaped part;
wherein the support base has a column member on a back side of a mounting surface for the rubber foot and protrudes toward a top chassis member constituting a top surface of the first chassis, and
wherein the column member abuts the top chassis member.

* * * * *